(12) United States Patent
Wang (10) Patent No.: US 11,622,545 B1
(45) Date of Patent: Apr. 11, 2023

(54) CIRCULATING WATER SYSTEM FOR INTENSIVE AQUACULTURE

(71) Applicant: Ding-Yuan Wang, Taoyuan (TW)

(72) Inventor: Ding-Yuan Wang, Taoyuan (TW)

(*) Notice: Subject to any disclaimer, the term of this patent is extended or adjusted under 35 U.S.C. 154(b) by 0 days.

(21) Appl. No.: 17/883,083

(22) Filed: Aug. 8, 2022

(30) Foreign Application Priority Data

Jun. 27, 2022 (TW) .................................. 111123874

(51) Int. Cl.
*A01K 63/04* (2006.01)
*F04D 11/00* (2006.01)
*A01K 61/10* (2017.01)

(52) U.S. Cl.
CPC ............ *A01K 63/047* (2013.01); *A01K 61/10* (2017.01); *A01K 63/042* (2013.01); *A01K 63/045* (2013.01); *F04D 11/00* (2013.01)

(58) Field of Classification Search
CPC .... A01K 63/047; A01K 61/10; A01K 63/042; A01K 63/045
See application file for complete search history.

(56) References Cited

U.S. PATENT DOCUMENTS

| | | | | |
|---|---|---|---|---|
| 10,123,516 | B2 * | 11/2018 | Robinson | A01K 63/047 |
| 2009/0120853 | A1 * | 5/2009 | Vento | A01K 63/02 210/167.26 |
| 2016/0000053 | A1 * | 1/2016 | Stime, Jr. | A01K 63/047 119/245 |
| 2022/0378023 | A1 * | 12/2022 | Pettenon | F04D 13/086 |

FOREIGN PATENT DOCUMENTS

| | | |
|---|---|---|
| CN | 212232708 U | 12/2020 |
| CN | 214389650 U | 10/2021 |
| TW | M278231 U | 10/2005 |
| TW | 200829775 A | 7/2008 |
| TW | 201019849 A | 6/2010 |

OTHER PUBLICATIONS

Search Report for TW111123874 dated Nov. 18, 2022.

* cited by examiner

*Primary Examiner* — Monica L Perry
(74) *Attorney, Agent, or Firm* — Demian K. Jackson; Jackson IPG PLLC (57) ABSTRACT

The circulating water system for intensive aquaculture disclosed herein includes a submersible pump, an outlet tube, an outer casing tube and a deflector plate. The submersible pump is adapted for being mounted on the bottom of an aquaculture pool at a position close to the circumferential wall. The outlet tube has a tapered section sleeved onto a discharge port, while the outer casing tube is sheathed outside the outlet tube. The deflector plate is mounted laterally to the submersible pump, such that when the submersible pump is pumping water from the aquaculture pool through the discharge port, the deflector plate acts to guide the discharged water approach the circumferential wall, thereby generating a circulating swirling flow rotating in tangential direction along the circumferential wall.

16 Claims, 6 Drawing Sheets

CIRCULATING WATER SYSTEM FOR INTENSIVE AQUACULTURE

CROSS REFERENCE TO RELATED APPLICATION

This application claims priority to R.O.C. Patent Application No. 111,123,874 filed Jun. 27, 2022, which is hereby incorporated by reference in their entirety.

FIELD OF THE INVENTION

The invention relates to a circulating water system for intensive aquaculture.

BACKGROUND OF THE INVENTION

As the human population on the earth has exceeded the seven billion mark, the demand for food has also increased sharply, and the demand for meat and aquatic products has also greatly expanded. One of the results is overfishing, causing depletion of fisheries and serious damage to natural ecosystems and, therefore, aquaculture is the only solution in the future to meet human needs for aquatic products. The water quality of aquaculture is critical to the survival rate of fish and shrimp. For example, temperature, pH value, ammonia nitrogen content, hydrogen sulfide content, nitrite content, transparency and dissolved oxygen content are some of the physical and chemical factors of water quality that that may affect greatly the survival rate of fish and shrimp.

Generally, traditional aquaculture fisheries use high-density aquaculture methods to increase productivity. However, high-density aquaculture will greatly increase the amounts of residual feed and the excretion of aquatic organisms in fish farms, resulting in a considerable increase in the concentrations of ammonia nitrogen and sodium nitrite. The decrease in the content of dissolved oxygen further facilitates water quality deterioration, leading to low survival rates of the aquaculture organisms. Therefore, most operators need to constantly change water and drainage to improve water quality. However, untreated sewage discharges into natural water can cause organic pollution in rivers and oceans. In addition, aquaculture operators often directly add chemical agents to water for disease control, as a means to decrease the death rate of fish and shrimp due to deterioration of water quality. If drugs are administered constantly, they will inevitably remain in the fish and shrimp bodies.

In order to increase the dissolved oxygen content in an aquaculture pool, thereby improving the survival rate of fish and shrimp and suppressing the growth of blue-green algae, aquaculture operators may use a conventional flow increasing device to circulate the sewage from the bottom to the surface of the pool to expose the sewage to the sunlight that would decompose the sewage and, at the same time, increase the amount of dissolved oxygen in the water and activate the aerobic bacteria in the aquaculture pool to reduce the amounts of ammonia ($NH_3$), nitrous acid ($NO_2$), hydrogen sulfide ($H_2S$), and other harmful metabolites. Typically, the conventional flow increasing devices, such as those disclosed in R.O.C. Patent No. 1271146, entitled "Flow Increasing Device With Sphere Floating Object," and R.O.C. Utility Model No. M381274, entitled "Flow Increasing Device," are provided with propeller blades which are driven to rotate by a motor, thus agitating the pool water to generate a circulating water flow. However, the water flow thus generated is directed towards the tangential direction in which the propeller blades rotate and, therefore, it can only be spread in a limited range and fails to generate a swirling flow covering between the upper and lower water strata. Moreover, although the propeller blades can generate a circulating water flow, a reaction force is also exerted on the blades themselves, causing the flow-increasing device to generate a rotating torque towards a direction opposite to that in which the blades rotate. This rotating torque tends to reduce the intensity of the water flow.

Some other aquaculture operators employ floating waterwheel aerators in aquaculture pools. The water pumping action exerted by the water pumping plates of the floating waterwheel aerators generates a large number of air bubbles (which contain oxygen), thereby increasing oxygen content in the aquaculture pools. However, the conventional floating waterwheel aerators can only disturb surface water layers of the pools, and most of the air bubbles generated are restrained to the surface water layers. The middle and lower water layers of the aquaculture pools cannot be supplied with sufficient oxygen through the bubbles generated by the floating waterwheel aerators and, as a result, oxygen is unevenly distributed in the pools. Furthermore, the bubbles thus generated are relatively large and tend to float upwards fast, which greatly reduces the amount of oxygen dissolved in water. Therefore, the operators who have been using the floating waterwheel aerators of this type for a period of time would start to note that the middle and lower water layers of the aquaculture pools are gradually filled with decaying organics and excess blue-green algae. The sludge accumulated in the pools is increasing, so that the fish and shrimp that normally live in the middle and lower water layers cannot survive due to lack of oxygen. Because the food, plants, fertilizers and dead animal in the pools cannot be well decomposed, sludge is accumulated significantly, making the pool water rotten and producing toxic gases, and the aquaculture pools are unable to culture. Therefore, the conventional floating waterwheel aerators fail to supply enough oxygen to the aquaculture pools and distribute oxygen evenly in the pools, resulting in the drawbacks of overgrowth of blue-green algae, deterioration of water quality, accumulation of sludge, and high mortality of fish and shrimp.

SUMMARY OF THE INVENTION

In view of the aforesaid, the invention provides a circulating water system for intensive aquaculture, which ensures that a circulating swirling flow is generated to disturb all the water strata in an aquaculture pool, so as to harmonize the water temperature and the dissolved oxygen content between different water strata.

For the above purpose, in the first aspect provided herein is a circulating water system for intensive aquaculture, which comprises a submersible pump adapted for being mounted on a bottom wall of an aquaculture pool at a position close to a circumferential wall of the aquaculture pool. The submersible pump is provided at one end with a base, which is formed with a suction port and a discharge port and provided with a propeller adapted to be driven by the submersible pump to rotate at a high speed to generate a suction force, such that water is sucked into the submersible pump through the suction port and then discharged from the submersible pump through the discharge port. The discharge port has a discharge direction arranged in parallel to a tangential direction of the circumferential wall at a point where the submersible pump is proximal to the circumferential wall. The system further comprises an outlet tube configured in form of a hollow tube having a tapered section sleeved onto the discharge port; an outer casing tube configured in a hollow tubular shape and sheathed outside the outlet tube, the outer casing tube having an inner diameter and a length greater than an outer diameter and a length of the outlet tube; and a deflector plate mounted laterally to the submersible pump and having a length covering the submersible pump and the outer casing tube, such that water discharged from the discharge port is guided by the deflector plate to approach the circumferential wall to generate a circulating swirling water flow.

The invention provides another circulating water system for intensive aquaculture, which comprises a land-based aquaculture pool comprising a bottom wall and a circumferential wall erecting at a circumference of the bottom wall. The system further comprises a submersible pump adapted for being mounted in the land-based aquaculture pool at a position close to the bottom wall and the circumferential wall. The submersible pump is provided at one end with a base, which is formed with a suction port and a discharge port and provided with a propeller adapted to be driven by the submersible pump to rotate at a high speed to generate a suction force, such that water is sucked into the submersible pump through the suction port and then discharged from the submersible pump through the discharge port. The discharge port has a discharge direction arranged in parallel to a tangential direction of the circumferential wall at a point where the submersible pump is proximal to the circumferential wall. The system further comprises an outlet tube configured in form of a hollow tube having a tapered section sleeved onto the discharge port; an outer casing tube configured in a hollow tubular shape and sheathed outside the outlet tube, the outer casing tube having an inner diameter and a length greater than an outer diameter and a length of the outlet tube; and a deflector plate mounted laterally to the submersible pump and having a length covering the submersible pump and the outer casing tube, such that water discharged from the discharge port is guided by the deflector plate to approach the circumferential wall to generate a circulating swirling water flow.

In a preferred embodiment, the invention further comprises a gas-liquid mixing pipe coupled between the discharge port and the outlet tube and an air inlet pipe pivotally connected at one end to the gas-liquid mixing pipe and extends at the other end upwards to water surface.

In a preferred embodiment, the outer casing tube is provided inside with at least one rib plate, through which the outer casing tube is fixed to an outer wall of the outlet tube.

In a preferred embodiment, the circumferential wall is further provided at top with at least one collection tank which is formed with at least one opening. The opening is arranged to face towards the discharge direction of the discharge port for collecting air bubbles and the impurities carried thereby.

In a preferred embodiment, the collection tank comprises a bottom portion, and the opening is located at a front end of the bottom portion. The bottom portion is formed at its rear end with another opening which is connected to a pipe leading to outside of the circumferential wall. The bottom portion is configured to have a ridge-shaped inner surface protruding upwardly.

In a preferred embodiment, the collection tank is provided on its outer surface with a floating body.

In a preferred embodiment, the bottom wall is tapered downwardly and outwardly to constitute a conical structure formed with a sewage outlet at central position.

In a preferred embodiment, the invention further comprises a filter module connected to the sewage outlet.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE PREFERRED EMBODIMENTS

Unless specified otherwise, the following terms as used in the specification and appended claims are given the following definitions. It should be noted that the indefinite article "a" or "an" as used in the specification and claims is intended to mean one or more than one, such as "at least one," "at least two," or "at least three," and does not merely refer to a singular one. In addition, the terms "comprising/comprises," "including/includes" and "having/has" as used in the claims are open languages and do not exclude unrecited elements. The term "or" generally covers "and/or", unless otherwise specified. The terms "about" and "substantially" used throughout the specification and appended claims are used to describe and account for small fluctuations or slight changes that do not materially affect the nature of the invention.

Figure 1:
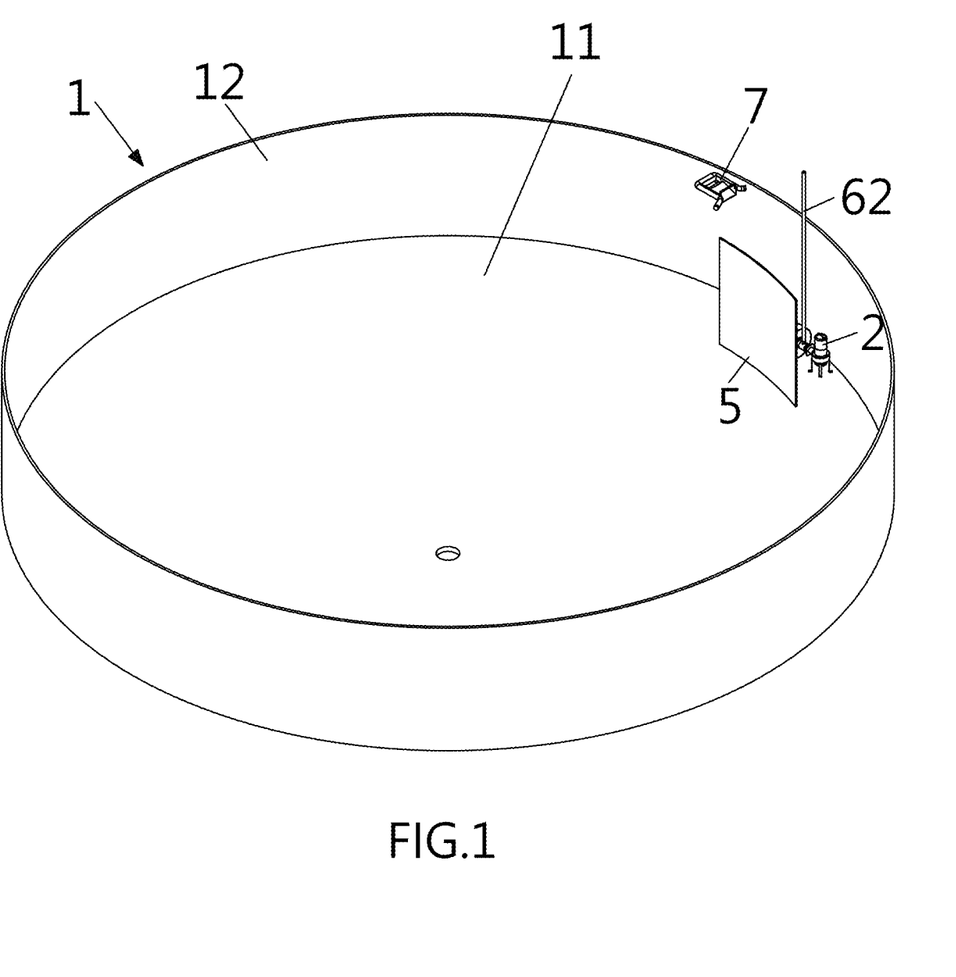
FIG. 1 is a perspective structural view of the circulating water system according to the invention, which is mounted on a land-based aquaculture pool.
Figure 2:
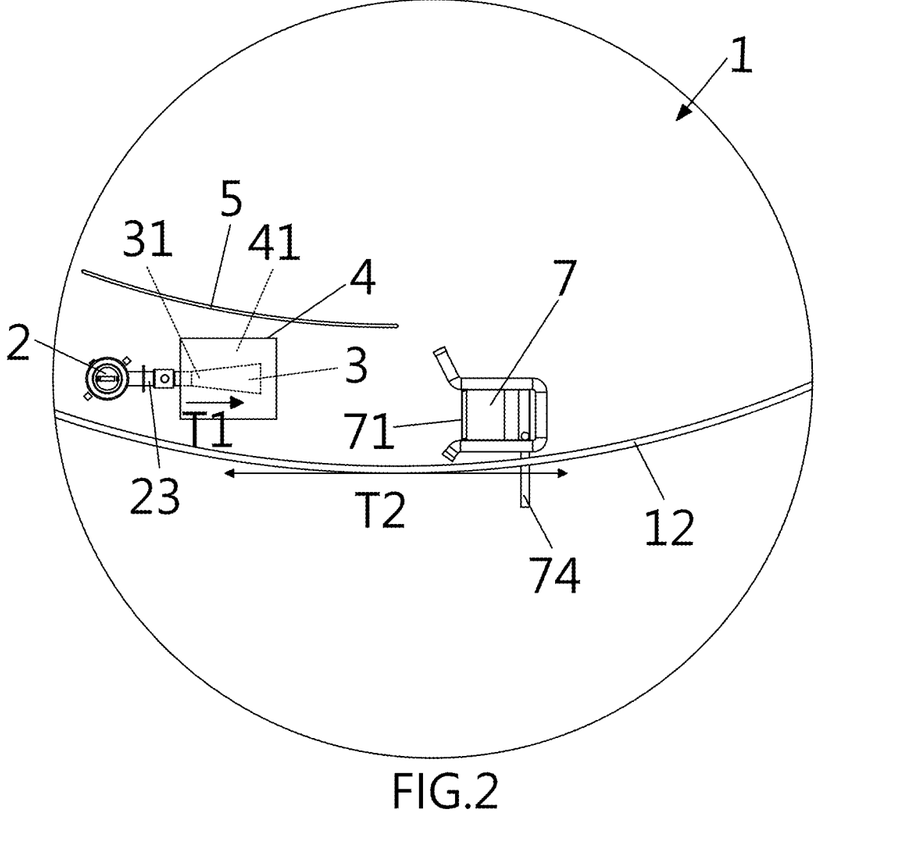
FIG. 2 is a schematic view of the circulating water system according to the invention.
Figure 3:
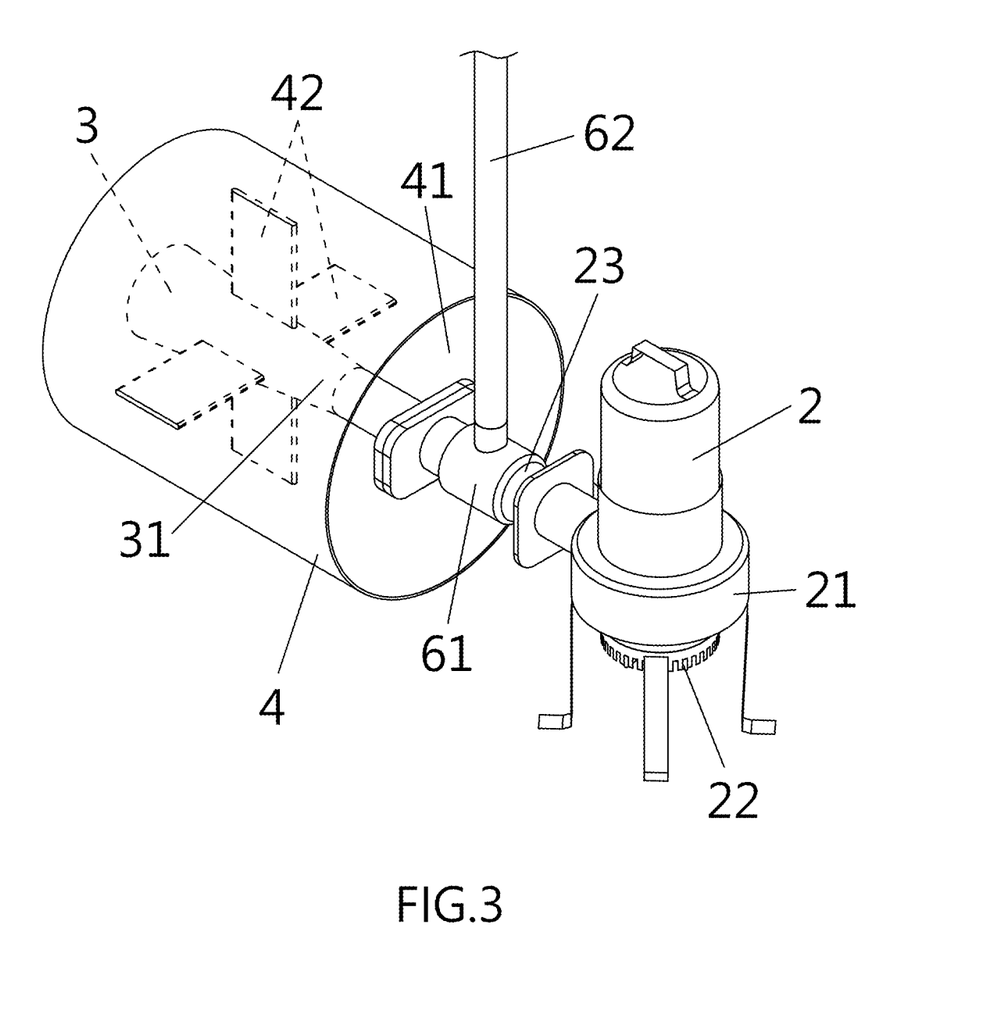
FIG. 3 is a perspective view of the circulating water system according to the invention.

As shown from FIG. 1 to FIG. 3, the circulating water system according to the invention is adapted for being installed in a common aquaculture pool or a land-based aquaculture pool. A barrel-type land-based aquaculture pool is illustrated by way of example in the Figures, which includes a bottom wall 11 and a circumferential wall 12 erecting at the circumference of the bottom wall 11. The inventive circulating water system comprises a submersible pump 2, an outlet tube 3, an outer casing tube 4, and a deflector plate 5.

The submersible pump 2 is adapted for being mounted in the land-based aquaculture pool 1 at a position close to the bottom wall 11 and the circumferential wall 12. The submersible pump 2 is provided at one end with a base 21, which is formed with a suction port 22 and a discharge port 23. The base 21 is provided with a propeller (not shown) adapted to be driven by the submersible pump 2 to rotate at a high speed to generate a suction force, such that water is sucked into the submersible pump 2 through the suction port 22 and then discharged from the submersible pump 2 through the discharge port 23. The discharge port 23 has a discharge direction T1 arranged towards a tangential direction of the circumferential wall 12. In one embodiment, the discharge direction T1 is arranged in parallel to the tangential direction at a point where the submersible pump 2 is proximal to the circumferential wall 12. Taking the barreltype-land-based aquaculture pool 1 as an example, the discharge direction T1 is arranged in parallel to the tangential direction T2 of the land-based aquaculture pool 1.

The outlet tube 3 is a hollow tube that has a tapered section 31 sleeved onto the discharge port 23.

The outer casing tube 4 is configured in a hollow tubular shape and sheathed outside the outlet tube 3. The outer casing tube 4 has an inner diameter and a length greater than an outer diameter and a length of the outlet tube 3, such that a suction hole 41 is formed between the inner wall of the outer casing tube 4 and the outer wall of the outlet tube 3. According to the embodiment shown in the figures, the outer casing tube 4 is provided inside with at least one rib plate 42, through which the outer casing tube 4 is fixed to the outer wall of the outlet tube 3.

The deflector plate 5 is mounted laterally to the submersible pump 2, such that the submersible pump 2 is located between the circumferential wall 12 and the deflector plate 5. The deflector plate 5 has a length covering the submersible pump 2 and the outer casing tube 4. According to the embodiment shown in the figures, the deflector plate 5 is configured in form of an arc-shaped plate and has a height greater than the outer diameter of the outer casing 4 and less than or equal to the height of the circumferential wall 12. The deflector plate 5 serves to guide the discharged water to flow along the tangential direction T2 of the circumferential wall 12 to generate a circulating swirling water flow. The distance between the deflector plate 5 and the submersible pump 2, as well as the distance between the deflector plate 5 and the outer casing tube 4, may vary depending on the needs.

When operating, the submersible pump 2 drives the propeller to rotate at a high speed, causing water to be sucked into the pump 2 through the suction port 22 and then discharged from the pump 2 via the discharge port 23. The Venturi effect occurs when water flows through the tapered section 31 of the outlet tube 3, causing the water to be sucked into the outer casing tube 4 through the suction hole 41 and, at the same time, accelerating the flow rate of water. The deflector plate 5 guides the discharged water to flow along the tangential direction T2 of the circumferential wall 12 to generate a circulating swirling water flow. As shown by the arrow in FIG. 4, the circulating swirling water flow thus generated rotates counterclockwise about the center of the land-based aquaculture pool 1, making the fish and shrimp in the aquaculture pool 1 swim clockwise to counter the water flow. Alternatively, the circulating swirling water flow may be arranged to circulate in a clockwise direction.

Figure 4:
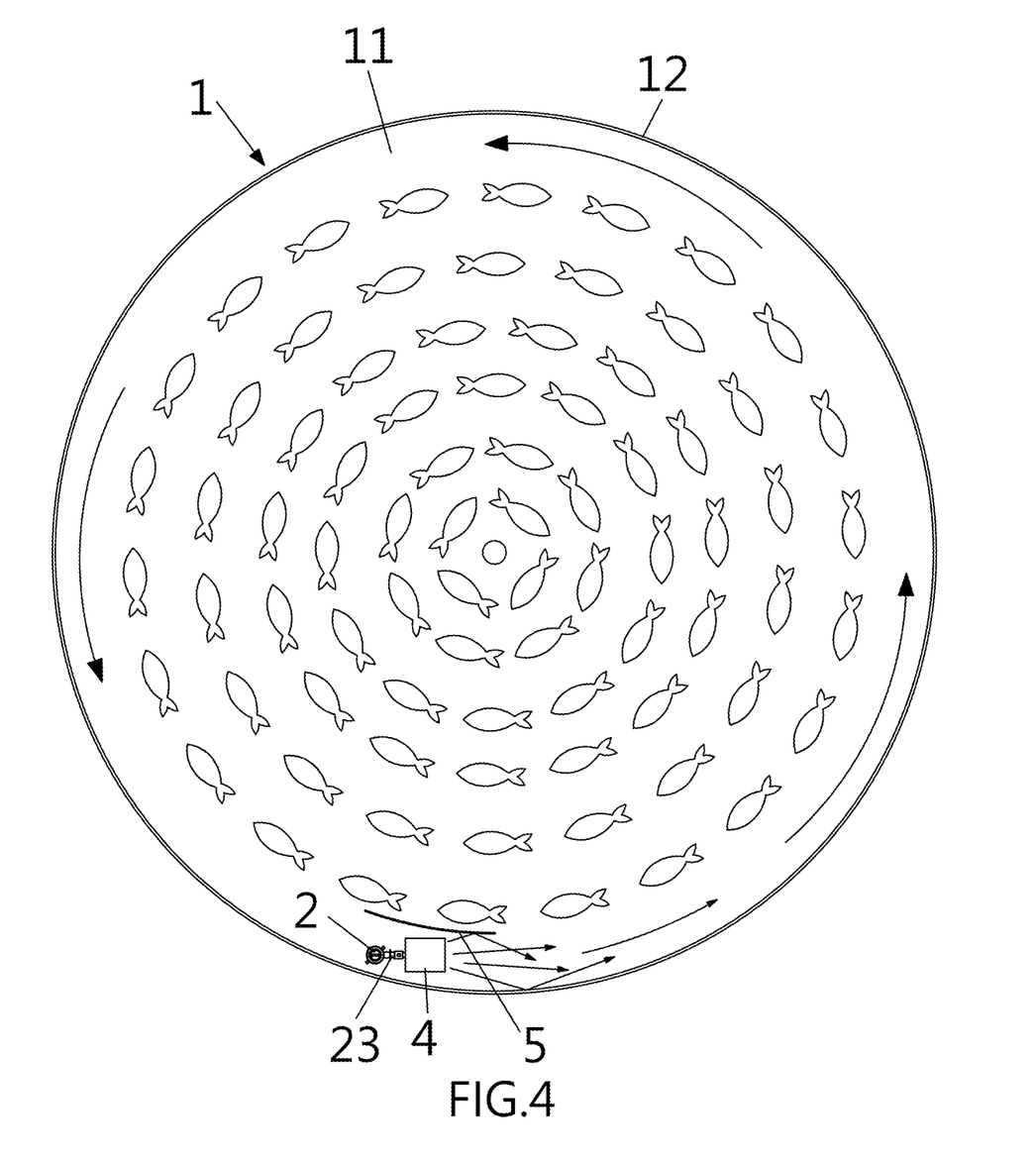
FIG. 4 is a schematic view showing the operation of the circulating water system according to the invention.

According to the invention, the discharge direction T1 of the discharge port 23 is directed towards the circumferential wall 12, so that the discharged water flows along the circumference tangential direction of the land-based aquaculture pool 1 and rotates about the center of the land-based aquaculture pool 1. The deflector plate 5 further concentrates the discharged water towards the circumferential wall 12 to generate a circulating swirling water flow. The venturi effect generated by the outlet tube 3 and the outer casing tube 4 further enhances the flow rate and amount of the circulating swirling water flow. Accordingly, the boundary layer of the water flow in the pool is controlled to ensure that a circulating swirling flow can be generated to disturb all the water strata in the aquaculture pool, so as to harmonize the water temperature and the dissolved oxygen content between different water strata.

Furthermore, as shown in FIG. 1 and FIG. 3, a gas-liquid mixing pipe 61 is coupled between the discharge port 23 and the outlet tube 3. An air inlet pipe 62 is further provided, which is pivotally connected at one end to the gas-liquid mixing pipe 61 and extends at the other end upwards to the water surface. Air may be introduced into the gas-liquid mixing pipe 61 through the air inlet pipe 62, so that it is brought to mix with water to generate an air-bubble-rich water flow. Afterwards, the air-bubble-rich water flow was discharged through the discharge port 23 to carry abundant air bubbles. Due to buoyancy, air bubbles tend to rise in the pool water and, thus, create an upward driving force which accelerates water flow and helps speeding up the circulating swirling water flow. When introduced into the land-based aquaculture pool, the air bubbles may improve the overall dissolved oxygen content and further carry protein impurities in the pool water to the water surface.

Figure 5:
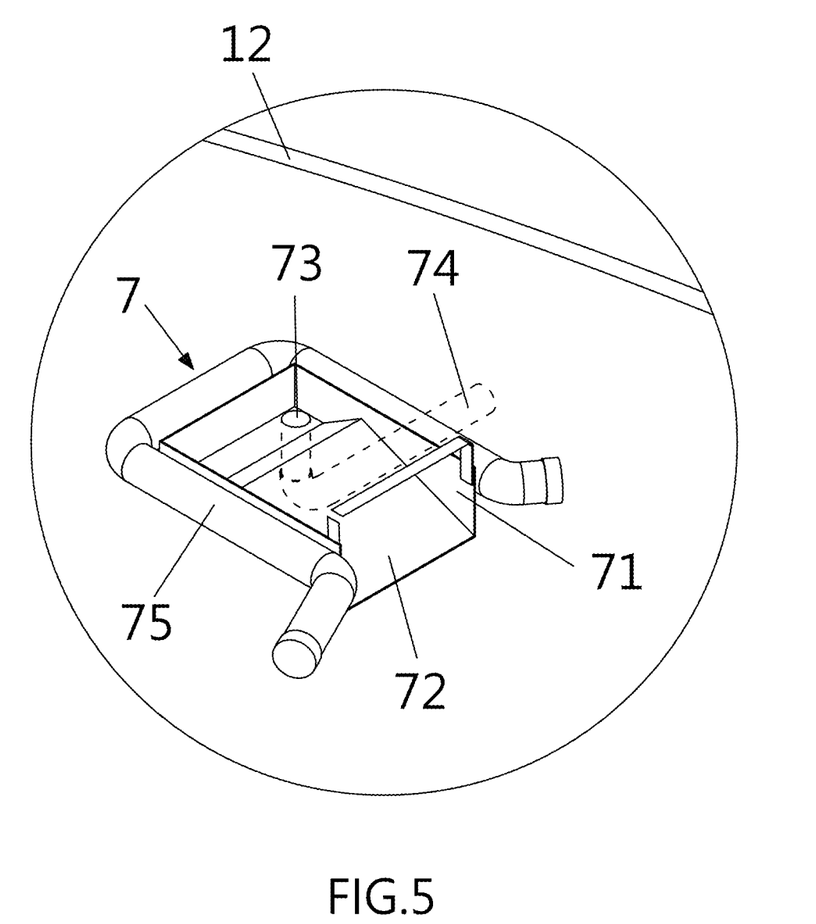
FIG. 5 is a structural schematic view of the collection tank according to the invention.

In addition, the circumferential wall 12 is further provided at top with at least one collection tank 7. As shown in FIG. 1, FIG. 2, and FIG. 5, the collection tank 7 is formed with at least one opening 71, which may face towards the flow direction of the circulating swirling water flow. According to the embodiment shown in the figures, the collection tank 7 is mounted at a position close to the top of the outer casing tube 4, and the opening 71 is arranged to face towards the discharge direction T1 of the discharge port 23 for collecting air bubbles and the impurities carried thereby. The collection tank 7 comprises a bottom portion 72, and the opening 71 is located at the front end of the bottom portion 72. The rear end of the bottom portion 72 is formed with another opening 73 which is connected to a pipe 74 leading to outside of the circumferential wall 12, and the bottom portion 72 is configured into a ridge form protruding upwardly. As the bubbles are rising upwards and flowing along with the circulating swirling water flow, they tend to enter the collection tank 7 through the opening 71 and move along the ridge surface of the bottom portion 72 to arrive at the rear end of the bottom portion 72, where the bubbles pass through the opening 73 and the pipe 74 and are then drained to outside of the circumferential wall 12. Meanwhile, water is blocked by the ridge-shaped bottom portion 72 from overflowing to the rear end of the bottom portion 72. Accordingly, the protein impurities present in the pool water are removed during the water circulation. The collection tank 7 may be provided on its outer surface with a floating body 75, as a means to ensure that the collection tank 7 is normally located on the water surface for collecting air bubbles.

Figure 6:
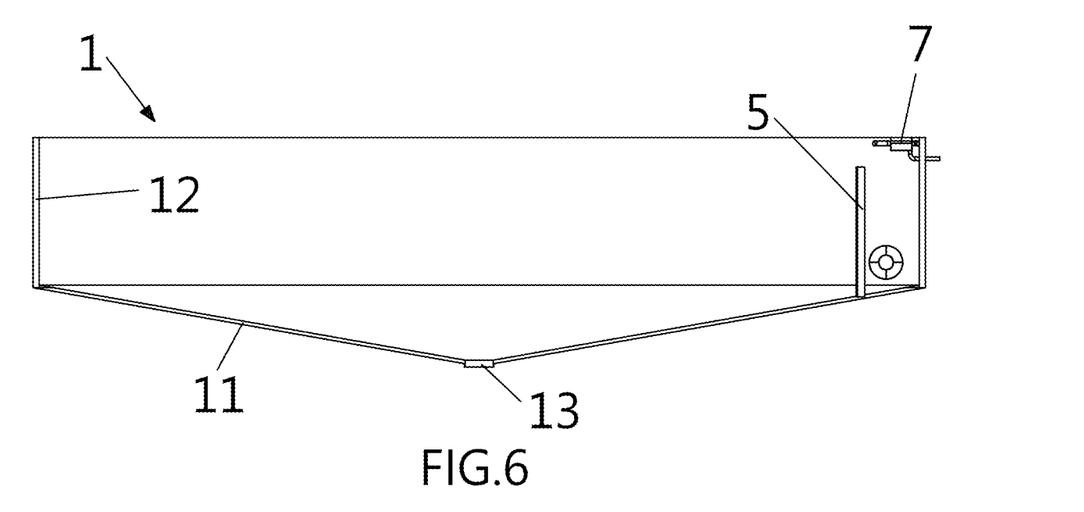
FIG. 6 is a structural schematic view of the land-based aquaculture pool according to the invention.

Furthermore, as shown in FIGS. 1 and 6, the bottom wall 11 is tapered downwardly and outwardly to constitute a conical structure formed with a sewage outlet 13 at central position. The sewage outlet 13 is adapted for connection to a filter module (not shown). Excess feed, animal excrement and other non-floating impurities present in the pool water, such as insect shells, will be accumulated at the center position by the circulating swirling water flow and then discharged through the sewage outlet 13. The discharged water is filtered by the filter module, and the filtered water may be re-introduced into the land-based aquaculture pool 1. The constituting members and the preferred embodiments of the filter module are known in the art and not detailed herein.

From the description of the above-mentioned embodiments, it can be seen that the circulating water system of intensive aquaculture according to the invention leads to the following improvements:

1. The invention realizes high-density aquaculture and leads to an increase in productivity. The swirling-type circulating water flow allows the fish and shrimp in the aquaculture pool to swim against the water flow. By virtue of orientation of the discharge port 23 and the deflector plate 5, as well as the Venturi effect attributed to the outlet tube 3 and the outer casing tube 4 to accelerate the flow rate, the invention generates a circulating swirling water flow covering various water layers, so that fish and shrimp living in respective water layers are rendered to swim along the same direction, thereby achieving high-density aquaculture. The fish and shrimp continue to migrate against the water flow and exercise every day, so that they grow faster with increased muscle firmness, thereby improving the productivity and quality of aquatic products. It is important to note that the invention generates multiple concentric circulating water flows in water layers, from the circumferential wall to the center of the aquaculture pool. In comparison, conventional flow increasing devices can only generate local water flows close to the propeller and cannot generate a circulating swirling water flow.

2. The invention effectively increases the dissolved oxygen content in the pool water. Air is introduced through the air inlet pipe and, due to the venturi effect generated by the outlet tube 3, it is mixed with water to generate air bubbles which are introduced into the aquaculture pool afterwards. The dissolved oxygen content in the aquaculture pool is enhanced accordingly, thereby improving the living environment of the aquaculture pool for aquatic organisms. Compared with the traditional floating waterwheel aerators, the invention can directly and effectively increase the dissolved oxygen content in water, and the water flow is accelerated due to buoyancy of the air bubbles. The protein impurities dissolved in water will adhere to the air bubbles, and these bubbles are continuously accumulated and ascend to the collection tank 7, thereby removing the protein impurities from water during the circulation. The air bubbles are discharged from the discharge port of the bottom portion, and their upward movement mixes the substances present in different water layers, thus balancing the dissolved oxygen content and the water temperature of respective water layers and, as a result, stabilizing the quality of aquatic products.

3. The invention achieves energy-saving effects. By virtue of orientation of the discharge port 23 of the submersible pump and the deflector plate 5, as well as the Venturi effect attributed to the outlet tube 3 and the outer casing tube 4, the invention generates a circulating swirling water flow covering various water layers, thus achieving the purpose of energy-saving. The introduction of air bubbles is shown to be useful in increasing the oxygen content in water and facilitating decomposition of the dirt in water. Because there is no need to change the pool water frequently, the invention saves water resources effectively, improves the water quality of the aquaculture pool and increases the productivity.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A circulating water system for intensive aquaculture, comprising:
 a submersible pump adapted for being mounted on a bottom wall of an aquaculture pool at a position close to a circumferential wall of the aquaculture pool, the submersible pump being provided at one end with a base, which is formed with a suction port and a discharge port and provided with a propeller adapted to be driven by the submersible pump to rotate at a high speed to generate a suction force, such that water is sucked into the submersible pump through the suction port and then discharged from the submersible pump through the discharge port, wherein the discharge port has a discharge direction arranged in parallel to a tangential direction of the circumferential wall;
 an outlet tube configured in form of a hollow tube having a tapered section sleeved onto the discharge port;
 an outer casing tube configured in a hollow tubular shape and sheathed outside the outlet tube, the outer casing tube having an inner diameter and a length greater than an outer diameter and a length of the outlet tube; and
 a deflector plate mounted laterally to the submersible pump and having a length covering the submersible pump and the outer casing tube, such that water discharged from the discharge port is guided by the deflector plate to approach the circumferential wall to generate a circulating swirling water flow.

2. The circulating water system of intensive aquaculture according to claim 1, further comprising a gas-liquid mixing pipe coupled between the discharge port and the outlet tube and an air inlet pipe pivotally connected at one end to the gas-liquid mixing pipe and extends at the other end upwards to water surface.

3. The circulating water system of intensive aquaculture according to claim 1, wherein the outer casing tube is provided inside with at least one rib plate, through which the outer casing tube is fixed to an outer wall of the outlet tube.

4. The circulating water system of intensive aquaculture according to claim 1, wherein the circumferential wall is further provided at top with at least one collection tank which is formed with at least one opening facing a direction along which the circulating swirling water flow is to be flowing.

5. The circulating water system of intensive aquaculture according to claim 4, wherein the opening is arranged to face towards the discharge direction of the discharge port.

6. The circulating water system of intensive aquaculture according to claim 4, wherein the collection tank comprises a bottom portion, and the opening is located at a front end of the bottom portion, and wherein the bottom portion is formed at its rear end with another opening which is connected to a pipe leading to outside of the circumferential wall, and the bottom portion is configured to have a ridge-shaped inner surface protruding upwardly.

7. The circulating water system of intensive aquaculture according to claim 4, wherein the collection tank is provided on its outer surface with a floating body.

8. A circulating water system for intensive aquaculture, comprising:
 a land-based aquaculture pool comprising a bottom wall and a circumferential wall erecting at a circumference of the bottom wall;
 a submersible pump adapted for being mounted in the land-based aquaculture pool at a position close to the bottom wall and the circumferential wall, the submersible pump being provided at one end with a base, which is formed with a suction port and a discharge port and provided with a propeller adapted to be driven by the submersible pump to rotate at a high speed to generate a suction force, such that water is sucked into the submersible pump through the suction port and then discharged from the submersible pump through the discharge port, wherein the discharge port has a discharge direction arranged in parallel to a tangential direction of the circumferential wall;

an outlet tube configured in form of a hollow tube having a tapered section sleeved onto the discharge port;

an outer casing tube configured in a hollow tubular shape and sheathed outside the outlet tube, the outer casing tube having an inner diameter and a length greater than an outer diameter and a length of the outlet tube; and a deflector plate mounted laterally to the submersible pump and having a length covering the submersible pump and the outer casing tube, such that water discharged from the discharge port is guided by the deflector plate to approach the circumferential wall to generate a circulating swirling water flow.

9. The circulating water system of intensive aquaculture according to claim 8, further comprising a gas-liquid mixing pipe coupled between the discharge port and the outlet tube and an air inlet pipe pivotally connected at one end to the gas-liquid mixing pipe and extends at the other end upwards to water surface.

10. The circulating water system of intensive aquaculture according to claim 8, wherein the outer casing tube is provided inside with at least one rib plate, through which the outer casing tube is fixed to an outer wall of the outlet tube.

11. The circulating water system of intensive aquaculture according to claim 8, wherein the circumferential wall is further provided at top with at least one collection tank which is formed with at least one opening facing a direction along which the circulating swirling water flow is to be flowing.

12. The circulating water system of intensive aquaculture according to claim 11, wherein the opening is arranged to face towards the discharge direction of the discharge port.

13. The circulating water system of intensive aquaculture according to claim 11, wherein the collection tank comprises a bottom portion, and the opening is located at a front end of the bottom portion, and wherein the bottom portion is formed at its rear end with another opening which is connected to a pipe leading to outside of the circumferential wall, and the bottom portion is configured to have a ridge-shaped inner surface protruding upwardly.

14. The circulating water system of intensive aquaculture according to claim 11, wherein the collection tank is provided on its outer surface with a floating body.

15. The circulating water system of intensive aquaculture according to claim 8, wherein the bottom wall is tapered downwardly and outwardly to constitute a conical structure formed with a sewage outlet at central position.

16. The circulating water system of intensive aquaculture according to claim 15, further comprising a filter module connected to the sewage outlet.

\* \* \* \* \*